(12) United States Patent
Wagner et al.

(10) Patent No.: US 11,620,647 B2
(45) Date of Patent: *Apr. 4, 2023

(54) PROVISIONING OF ACCESS CREDENTIALS USING DEVICE CODES

(71) Applicant: Visa International Service Association, San Francisco, CA (US)

(72) Inventors: Kim R. Wagner, Sunnyvale, CA (US); John F. Sheets, San Francisco, CA (US); Glenn Powell, Fremont, CA (US)

(73) Assignee: Visa International Service Association, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/167,344

(22) Filed: Feb. 4, 2021

(65) Prior Publication Data
US 2021/0166228 A1 Jun. 3, 2021

Related U.S. Application Data

(63) Continuation of application No. 15/148,896, filed on May 6, 2016, now Pat. No. 10,949,841.

(60) Provisional application No. 62/158,495, filed on May 7, 2015.

(51) Int. Cl.
| | |
|---|---|
| *G06Q 20/38* | (2012.01) |
| *G06Q 20/40* | (2012.01) |
| *G06Q 20/36* | (2012.01) |
| *G06Q 20/32* | (2012.01) |
| *H04W 12/08* | (2021.01) |
| *H04L 9/40* | (2022.01) |
| *H04W 12/06* | (2021.01) |

(52) U.S. Cl.
CPC ..... *G06Q 20/38215* (2013.01); *G06Q 20/322* (2013.01); *G06Q 20/3674* (2013.01); *G06Q 20/3821* (2013.01); *G06Q 20/401* (2013.01); *H04L 63/0807* (2013.01); *H04W 12/068* (2021.01); *H04W 12/08* (2013.01)

(58) Field of Classification Search
CPC ......... G06Q 20/20; G06F 17/00; G06K 19/00
USPC ................................. 235/383, 375, 487, 382
See application file for complete search history.

(56) References Cited

U.S. PATENT DOCUMENTS

| | | | |
|---|---|---|---|
| 6,263,446 B1 * | 7/2001 | Kausik | G06F 21/6245 |
| | | | 380/259 |
| 6,327,578 B1 | 12/2001 | Linehan | |
| 8,326,759 B2 | 12/2012 | Hammad | |
| 2004/0059688 A1 | 3/2004 | Dominguez et al. | |
| 2005/0105734 A1 | 5/2005 | Buer et al. | |
| 2006/0048233 A1 | 3/2006 | Buttross et al. | |

(Continued)

FOREIGN PATENT DOCUMENTS

AU 2014353151 A1 * 5/2016 ........... G06Q 20/322

OTHER PUBLICATIONS

U.S. Appl. No. 15/148,896 , "Final Office Action", dated Mar. 27, 2020, 10 pages.

(Continued)

*Primary Examiner* — Edwyn Labaze
(74) *Attorney, Agent, or Firm* — Kilpatrick Townsend & Stockton LLP

(57) ABSTRACT

Systems and methods are described for provisioning access credentials to a mobile device using device and authorization codes. Once provisioned, a mobile device can be used to conduct a transaction.

17 Claims, 9 Drawing Sheets

(56) References Cited

U.S. PATENT DOCUMENTS

| | | | |
|---|---|---|---|
| 2009/0300758 A1* | 12/2009 | Hauck | H04L 9/3247 |
| | | | 726/21 |
| 2010/0088237 A1 | 4/2010 | Wankmueller | |
| 2010/0293189 A1 | 11/2010 | Hammad | |
| 2010/0318783 A1 | 12/2010 | Raj et al. | |
| 2011/0202466 A1* | 8/2011 | Carter | G06Q 20/3224 |
| | | | 705/67 |
| 2012/0272307 A1 | 10/2012 | Buer | |
| 2013/0041830 A1* | 2/2013 | Singh | G06Q 20/3825 |
| | | | 705/65 |
| 2013/0054454 A1 | 2/2013 | Purves et al. | |
| 2014/0008433 A1 | 1/2014 | Hammad et al. | |
| 2014/0047524 A1 | 2/2014 | Auger | |
| 2014/0058951 A1 | 2/2014 | Kuppuswamy | |
| 2014/0137209 A1 | 5/2014 | Eonnet | |
| 2014/0215587 A1 | 7/2014 | Burch | |
| 2014/0279477 A1 | 9/2014 | Sheets et al. | |
| 2014/0344153 A1 | 11/2014 | Raj et al. | |
| 2015/0032626 A1 | 1/2015 | Dill et al. | |
| 2015/0140960 A1* | 5/2015 | Powell | H04M 15/755 |
| | | | 455/406 |
| 2015/0199679 A1 | 7/2015 | Palanisamy et al. | |
| 2015/0271164 A1 | 9/2015 | Hamid | |
| 2015/0327072 A1 | 11/2015 | Powell et al. | |
| 2016/0028737 A1 | 1/2016 | Srinivasan et al. | |
| 2016/0037444 A1* | 2/2016 | Jung | H04W 52/0203 |
| | | | 370/338 |
| 2016/0042263 A1 | 2/2016 | Gaddam et al. | |
| 2016/0042333 A1 | 2/2016 | Ho et al. | |
| 2016/0044511 A1 | 2/2016 | Broch et al. | |
| 2016/0065370 A1 | 3/2016 | Le Saint et al. | |
| 2016/0086184 A1* | 3/2016 | Carpenter | G06Q 20/322 |
| | | | 705/44 |
| 2016/0087956 A1 | 3/2016 | Maheshwari et al. | |
| 2016/0094991 A1 | 3/2016 | Powell et al. | |
| 2016/0148197 A1 | 5/2016 | Dimmick | |
| 2016/0173483 A1 | 6/2016 | Wong et al. | |
| 2016/0218875 A1* | 7/2016 | Le Saint | H04L 9/0841 |
| 2016/0253651 A1 | 9/2016 | Park et al. | |
| 2016/0262013 A1 | 9/2016 | Redberg et al. | |
| 2016/0308995 A1 | 10/2016 | Youdale et al. | |
| 2016/0328707 A1 | 11/2016 | Wagner et al. | |
| 2016/0337351 A1 | 11/2016 | Spencer et al. | |
| 2016/0381003 A1 | 12/2016 | Caceres et al. | |
| 2017/0063975 A1* | 3/2017 | Prakash | H04L 67/34 |
| 2018/0041487 A1 | 2/2018 | Wang | |
| 2020/0053560 A1 | 2/2020 | Lopez | |
| 2020/0097960 A1 | 3/2020 | Wong et al. | |

OTHER PUBLICATIONS

U.S. Appl. No. 15/148,896 , "Non-Final Office Action", dated Feb. 27, 2019, 7 pages.
U.S. Appl. No. 15/148,896 , "Non-Final Office Action", dated Aug. 29, 2019, 8 pages.
U.S. Appl. No. 15/148,896 , "Non-Final Office Action", dated Jun. 24, 2020, 9 pages.
U.S. Appl. No. 15/148,896 , "Notice of Allowance", dated Nov. 4, 2020, 8 pages.

* cited by examiner

PROVISIONING OF ACCESS CREDENTIALS USING DEVICE CODES

CROSS-REFERENCES TO RELATED APPLICATIONS

This application is a Continuation of U.S. patent application Ser. No. 15/148,896, filed on May 6, 2016, which is a non-provisional of and claims the benefit of the filing date of U.S. Provisional Patent Application No. 62/158,495, which was filed on May 7, 2015, which is are herein incorporated by reference in its their entirety for all purposes.

BACKGROUND

There is a need for a more convenient authentication process during the provisioning of credentials. Credentials may include access tokens that can access various resources such as goods, services, data, or specific venues or locations. Such credentials may be provisioned to a mobile device such as a mobile phone so that the mobile phone can use the credentials to access various resources.

One problem that is associated with the provisioning of credentials is that credentials can be provisioned by one entity, while another entity may actually authorize the provisioning. The different entities utilize different systems and the coordination between such systems is difficult. It is also difficult to ensure that the entity that is requesting the provisioning is in fact authorized to do so and that the device that is being provisioned is the right device. More convenient, efficient, and/or secure credential provisioning methods and systems are needed.

Embodiments of the invention address these and other problems, individually and collectively.

BRIEF SUMMARY

Embodiments of the present invention relate to systems and methods for provisioning access credentials onto mobile devices using device codes and authorization codes.

One embodiment of the invention is directed to a method comprising: providing, by a mobile device or a communication device, a device code to an authorization computer. The authorization computer thereafter generates an authorization code using at least the device code. The method also comprises receiving, by the mobile device or the communication device, the authorization code; providing, by the mobile device, the authorization code to an access credential provisioning server computer; and receiving, by the mobile device from the access credential provisioning server computer, an access credential. The mobile device is configured to provide the access credential to an access device to gain access to a resource.

Another embodiment of the invention is directed to a mobile device comprising: a processor; an antenna coupled to the processor; and a computer readable medium coupled to the processor. The computer readable medium comprises code, executable by the processor to implement a method comprising providing a device code to an authorization computer. The authorization computer thereafter generates an authorization code using at least the device code. The method also comprises receiving the authorization code, providing the authorization code to an access credential provisioning server computer, and receiving an access credential. The mobile device is configured to provide the access credential to an access device to gain access to a resource.

Another embodiment of the invention is directed to a method comprising: receiving, by a server computer, a device code from a mobile device or a communication device operated by a user; generating, by the server computer, an authorization code using the device code; and transmitting, by the server computer, the authorization code to the mobile device or the communication device. The authorization code is provided by the user to a provisioning server computer, which verifies the authorization code and provisions the mobile device with one or more access credentials.

These and other embodiments of the invention are described in further detail below.

DETAILED DESCRIPTION

Figure 1:
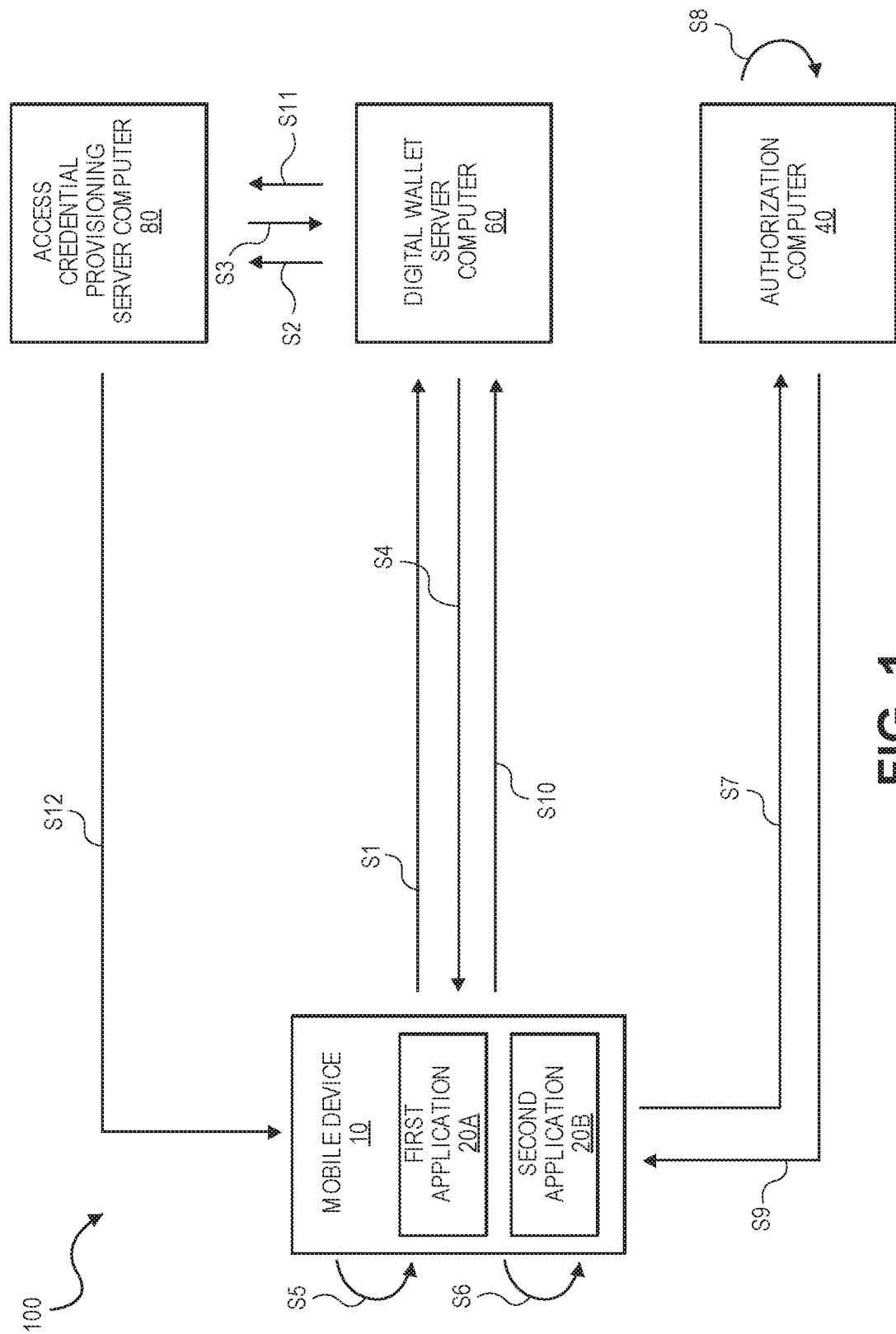
FIG. 1 show a block diagram of a system according to an embodiment of the invention, with a process flow.

Embodiments of the invention can be used in a step-up authentication process during the provisioning of one or more access credentials (e.g., payment tokens) to a mobile device. In some embodiments, a user of a mobile device may have already commenced the provisioning process. An entity such as an issuing bank, payment processor, token vault, building access authority, transit agency, etc., may have decided that additional authentication is needed before allowing the user to obtain the requested one or more access credentials.

In some embodiments, the one or more access credentials may be used to conduct payment transactions. If step-up authentication is desired after the user has requested that the user's mobile device be provisioned with the one or more access credentials, then in some embodiments, the user may be instructed to log into their online banking site with their issuer. The user's ability to log into their online banking site can serve as an additional authentication factor to ensure that the user requesting the one or more access credentials is in fact authorized to do so. The issuer may eventually be provided with a device code, which ties any transaction conducted using the access credentials to a particular mobile device.

There are several options regarding which entity generates the device code, which data elements are used to generate the device code, and how the device code is provided (e.g., transmitted) to the issuer. Such options are described in greater detail below. Once the issuer has the device code, it can generate an authorization code from the device code. The authorization code can be returned to the mobile device and/or the user. The user may then provide the authorization code to the provisioning server computer, which may then verify the authorization code. If the authorization code is verified, then the provisioning server computer may then provision the mobile device with the requested access credentials.

Embodiments of the invention have a number of advantages. For example, embodiments of the invention can ensure that the correct user and the correct mobile device are in fact authorized to receive the access credentials. Further, embodiments of the invention are "lightweight," since not much interaction or communication between an authorizing entity and a provisioning entity is needed to accomplish the authentication needed for the access credential provisioning process as well as the provisioning process itself. In embodiments of the invention, a real time link between the provisioning entity and the authorizing entity is advantageously not needed.

Prior to discussing specific embodiments of the invention, some terms may be described in detail.

A "mobile device" may comprise any electronic device that may be transported and operated by a user, which may also provide remote communication capabilities to a network. Examples of remote communication capabilities include using a mobile phone (wireless) network, wireless data network (e.g., 3G, 4G or similar networks), Wi-Fi, Wi-Max, or any other communication medium that may provide access to a network such as the Internet or a private network. Examples of mobile devices include mobile phones (e.g., cellular phones), PDAs, tablet computers, net books, laptop computers, personal music players, hand-held specialized readers, wearable devices (e.g., watches), vehicles (e.g., cars), etc. A mobile device may comprise any suitable hardware and software for performing such functions, and may also include multiple devices or components (e.g., when a device has remote access to a network by tethering to another device—i.e., using the other device as a relay—both devices taken together may be considered a single mobile device).

"Authentication data" may include any data suitable for authenticating a user or mobile device. Authentication data may be obtained from a user or a device that is operated by the user. Examples of authentication data obtained from a user may include PINs (personal identification numbers), passwords, etc. Examples of authentication data that may be obtained from a device may include device serial numbers, hardware secure element identifiers, device fingerprints, phone numbers, IMEI numbers, etc.

A "provisioning server computer" may include any suitable computer that can provision data such as one or more access credentials to a device. In some embodiments of the invention, a provisioning server computer may be an access credential provisioning server computer, which may provision access credentials to a mobile device such as a mobile phone, over the air. An access provisioning server computer may store or generate access credentials. In some embodiments, an access provisioning server computer may include a token vault.

A "payment device" may include any suitable device that may be used to conduct a financial transaction, such as to provide payment credentials to a merchant. The payment device may be a software object, a hardware object, or a physical object. As examples of physical objects, the payment device may comprise a substrate such as a paper or plastic card, and information that is printed, embossed, encoded, or otherwise included at or near a surface of an object. A hardware object can relate to circuitry (e.g., permanent voltage values), and a software object can relate to non-permanent data stored on a device. A payment device may be associated with a value such as a monetary value, a discount, or store credit, and a payment device may be associated with an entity such as a bank, a merchant, a payment processing network, or a person. A payment device may be used to make a payment transaction. Suitable payment devices can be hand-held and compact so that they can fit into a user's wallet and/or pocket (e.g., pocket-sized). Example payment devices may include smart cards, magnetic stripe cards, keychain devices (such as the Speedpass™ commercially available from Exxon-Mobil Corp.), etc. Other examples of mobile devices include pagers, payment cards, security cards, access cards, smart media, transponders, and the like. If the payment device is in the form of a debit, credit, or smartcard, the payment device may also optionally have features such as magnetic stripes. Such devices can operate in either a contact or contactless mode. In some embodiments, a mobile device can function as a payment device (e.g., a mobile device can store and be able to transmit payment credentials for a transaction).

A "credential" may be any suitable information that serves as reliable evidence of worth, ownership, identity, or authority. An "access credential" may be a credential that may be used to gain access to a particular resource (e.g., a good, service, location, etc.). A credential may be a string of numbers, letters, or any other suitable characters, or any object or document that can serve as confirmation. Examples of credentials include identification cards, certified documents, access cards, passcodes and other login information, payment account numbers, access badge numbers, payment tokens, access tokens, etc.

"Payment credentials" may include any suitable information associated with an account (e.g. a payment account and/or payment device associated with the account). Such information may be directly related to the account or may be derived from information related to the account. Examples of account information may include a PAN (primary account number or "account number"), user name, expiration date, CVV (card verification value), dCVV (dynamic card verification value), CVV2 (card verification value 2), CVC3 card verification values, etc. Payment credentials may be any information that identifies or is associated with a payment account. Payment credentials may be provided in order to make a payment from a payment account. Payment credentials can also include a user name, an expiration date, a gift card number or code, and any other suitable information.

An "application" may be computer code or other data stored on a computer readable medium (e.g. memory element or secure element) that may be executable by a processor to complete a task.

A "digital wallet" can include an electronic device that allows an individual to conduct electronic commerce transactions. A digital wallet may store user profile information, payment credentials, bank account information, one or more digital wallet identifiers and/or the like and can be used in a variety of transactions, such as but not limited to eCommerce, social networks, money transfer/personal payments, mobile commerce, proximity payments, gaming, and/or the like for retail purchases, digital goods purchases, utility payments, purchasing games or gaming credits from gaming websites, transferring funds between users, and/or the like.

A "digital wallet provider" may include an entity, such as an issuing bank or third party service provider, that issues a digital wallet to a user that enables the user to conduct financial transactions. A digital wallet provider may provide standalone user-facing software applications that store account numbers, or representations of the account numbers (e.g., payment tokens), on behalf of a cardholder (or other user) to facilitate payments at more than one unrelated merchant, perform person-to-person payments, or load financial value into the digital wallet. A digital wallet provider may enable a user to access its account via a personal computer, mobile device or access device.

A "token" may be a substitute value for a real credential. A token may be a type of credential, and may be a string of numbers, letters, or any other suitable characters. Examples of tokens include payment tokens, access tokens, personal identification tokens, etc.

A "payment token" may include an identifier for a payment account that is a substitute for an account identifier, such as a primary account number (PAN). For example, a token may include a series of alphanumeric characters that may be used as a substitute for an original account identifier. For example, a token "4900 0000 0000 0001" may be used in place of a PAN "4147 0900 0000 1234." In some embodiments, a token may be "format preserving" and may have a numeric format that conforms to the account identifiers used in existing transaction processing networks (e.g., ISO 8583 financial transaction message format). In some embodiments, a token may be used in place of a PAN to initiate, authorize, settle or resolve a payment transaction or represent the original credential in other systems where the original credential would typically be provided. In some embodiments, a token value may be generated such that the recovery of the original PAN or other account identifier from the token value may not be computationally derived. Further, in some embodiments, the token format may be configured to allow the entity receiving the token to identify it as a token and recognize the entity that issued the token.

"Tokenization" is a process by which data is replaced with substitute data. For example, a payment account identifier (e.g., a primary account number (PAN)) may be tokenized by replacing the primary account identifier with a substitute number (e.g. a token) that may be associated with the payment account identifier. Further, tokenization may be applied to any other information that may be replaced with a substitute value (i.e., token). Tokenization may be used to enhance transaction efficiency, improve transaction security, increase service transparency, or to provide a method for third-party enablement.

A "token provider" or "token service system" can include a system that services tokens. In some embodiments, a token service system can facilitate requesting, determining (e.g., generating) and/or issuing tokens, as well as maintaining an established mapping of tokens to primary account numbers (PANs) in a repository (e.g. token vault). In some embodiments, the token service system may establish a token assurance level for a given token to indicate the confidence level of the token to PAN binding. The token service system may include or be in communication with a token vault where the generated tokens are stored. The token service system may support token processing of payment transactions submitted using tokens by de-tokenizing the token to obtain the actual PAN. In some embodiments, a token service system may include a tokenization computer alone, or in combination with other computers such as a transaction processing network computer.

A "token domain" may indicate an area and/or circumstance in which a token can be used. Examples of the token domain may include, but are not limited to, payment channels (e.g., e-commerce, physical point of sale, etc.), POS entry modes (e.g., contactless, magnetic stripe, etc.), and merchant identifiers to uniquely identify where the token can be used. A set of parameters (i.e. token domain restriction controls) may be established as part of token issuance by the token service provider that may allow for enforcing appropriate usage of the token in payment transactions. For example, the token domain restriction controls may restrict the use of the token with particular presentment modes, such as contactless or e-commerce presentment modes. In some embodiments, the token domain restriction controls may restrict the use of the token at a particular merchant that can be uniquely identified. Some exemplary token domain restriction controls may require the verification of the presence of a token cryptogram that is unique to a given transaction. In some embodiments, a token domain can be associated with a token requestor.

"Token expiry date" may refer to the expiration date/time of the token. The token expiry date may be passed among the entities of the tokenization ecosystem during transaction processing to ensure interoperability. The token expiration date may be a numeric value (e.g. a 4-digit numeric value). In some embodiments, the token expiry date can be expressed as a time duration as measured from the time of issuance.

A "token request message" may be an electronic message for requesting a token. A token request message may include information usable for identifying a payment account or digital wallet, and/or information for generating a payment token. For example, a token request message may include payment credentials, mobile device identification information (e.g. a phone number or MSISDN), a digital wallet identifier, information identifying a tokenization service provider, a merchant identifier, a cryptogram, and/or any other suitable information. Information included in a token request message can be encrypted (e.g., with an issuer-specific key).

A "token response message" may be a message that responds to a token request. A token response message may include an indication that a token request was approved or denied. A token response message may also include a payment token, mobile device identification information (e.g. a phone number or MSISDN), a digital wallet identifier, information identifying a tokenization service provider, a merchant identifier, a cryptogram, and/or any other suitable information. Information included in a token response message can be encrypted (e.g., with an issuer-specific key).

A "user" may include an individual. In some embodiments, a user may be associated with one or more personal accounts and/or mobile devices. The user may also be referred to as a cardholder, account holder, or consumer.

A "resource provider" may be an entity that can provide a resource such as goods, services, information, and/or access. Examples of resource providers include merchants, access devices, secure data access points, etc. A "merchant" may typically be an entity that engages in transactions and can sell goods or services, or provide access to goods or services.

An "acquirer" may typically be a business entity (e.g., a commercial bank) that has a business relationship with a particular merchant or other entity. Some entities can perform both issuer and acquirer functions. Some embodiments may encompass such single entity issuer-acquirers. An acquirer may operate an acquirer computer, which can also be generically referred to as a "transport computer".

An "authorizing entity" may be an entity that authorizes a request. Examples of an authorizing entity may be an issuer, a governmental agency, a document repository, an access administrator, etc. An "issuer" may typically refer to a business entity (e.g., a bank) that maintains an account for a user. An issuer may also issue payment credentials stored on a user device, such as a cellular telephone, smart card, tablet, or laptop to the consumer. An authorizing entity may operate an authorizing computer.

An "access device" may be any suitable device that provides access to a remote system. An access device may also be used for communicating with a merchant computer, a transaction processing computer, an authentication computer, or any other suitable system. An access device may generally be located in any suitable location, such as at the location of a merchant. An access device may be in any suitable form. Some examples of access devices include POS or point of sale devices (e.g., POS terminals), cellular phones, PDAs, personal computers (PCs), tablet PCs, hand-held specialized readers, set-top boxes, electronic cash registers (ECRs), automated teller machines (ATMs), virtual cash registers (VCRs), kiosks, security systems, access systems, and the like. An access device may use any suitable contact or contactless mode of operation to send or receive data from, or associated with, a user mobile device. In some embodiments, where an access device may comprise a POS terminal, any suitable POS terminal may be used and may include a reader, a processor, and a computer-readable medium. A reader may include any suitable contact or contactless mode of operation. For example, exemplary card readers can include radio frequency (RF) antennas, optical scanners, bar code readers, or magnetic stripe readers to interact with a payment device and/or mobile device. In some embodiments, a cellular phone, tablet, or other dedicated wireless device used as a POS terminal may be referred to as a mobile point of sale or an "mPOS" terminal.

An "authorization request message" may be an electronic message that is sent to request authorization for a transaction. In some embodiments, an authorization request message may be an electronic message that is sent to a payment processing network and/or an issuer of a payment card to request authorization for a transaction. An authorization request message according to some embodiments may comply with ISO 8583, which is a standard for systems that exchange electronic transaction information associated with a payment made by a consumer using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), an expiration date, etc. An authorization request message may also comprise "transaction information," such as any information associated with a current transaction, such as the transaction amount, merchant identifier, merchant location, etc., as well as any other information that may be utilized in determining whether to identify and/or authorize a transaction.

An "authorization response message" may be an electronic message reply to an authorization request message. It may be generated by an issuing financial institution or a payment processing network. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the payment processing network) to the merchant's access device (e.g. POS equipment) that indicates approval of the transaction. The code may serve as proof of authorization. As noted above, in some embodiments, a payment processing network may generate or forward the authorization response message to the merchant.

A "server computer" is typically a powerful computer or cluster of computers. For example, the server computer can be a large mainframe, a minicomputer cluster, or a group of servers functioning as a unit. In one example, the server computer may be a database server coupled to a Web server.

A "processor" may refer to any suitable data computation device or devices. A processor may comprise one or more microprocessors working together to accomplish a desired function. The processor may include CPU comprises at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

A "device code" may be a code that is specifically associated with a device (e.g., only one device). The device code can be derived from any device specific information including, but not limited to include one or more of a secure element identifier (SE ID), an IMEI number, a phone number, a geo-location, a device serial number, a device fingerprint, etc. Such codes may be derived from such information using any suitable mathematical operation including hashing and/or encryption. Device codes may include any suitable number and/or type of characters.

An "authorization code" may be a code that can approve of a certain activity, if valid. Authorization codes may include any suitable number and/or type of characters. In some embodiments, the authorization code may be generated by one entity (e.g., an issuer) and then validated by another entity (e.g., a provisioning server computer). The authorization code may be derived from any suitable type or combination of data. For example, in some embodiments, an authorization code may be derived from a credential such as a PAN (or a precursor to the credential or a derivative thereof), the device code, and an authorizing entity identifier (e.g., an issuer identifier or an identifier for an authorizing computer).

FIG. 1 shows an exemplary system 100 according to an embodiment of the invention. The system 100 may include a mobile device 10, which can communicate with a digital wallet server computer 60. The digital wallet server computer 60 may be in communication with an access credential provisioning server computer 80. The access credential provisioning server computer 80 as well as an authorization computer 40 may be in communication with the mobile device 10. The computers 40, 60, and 80 may be implemented as cloud-based or non-cloud-based systems.

Messages between the computers, networks, and devices in FIG. 1 (as well as in FIG. 2) may be transmitted using a secure communications protocols such as, but not limited to, File Transfer Protocol (FTP); HyperText Transfer Protocol (HTTP); Secure Hypertext Transfer Protocol (HTTPS), Secure Socket Layer (SSL), ISO (e.g., ISO 8583) and/or the like.

Figure 6:
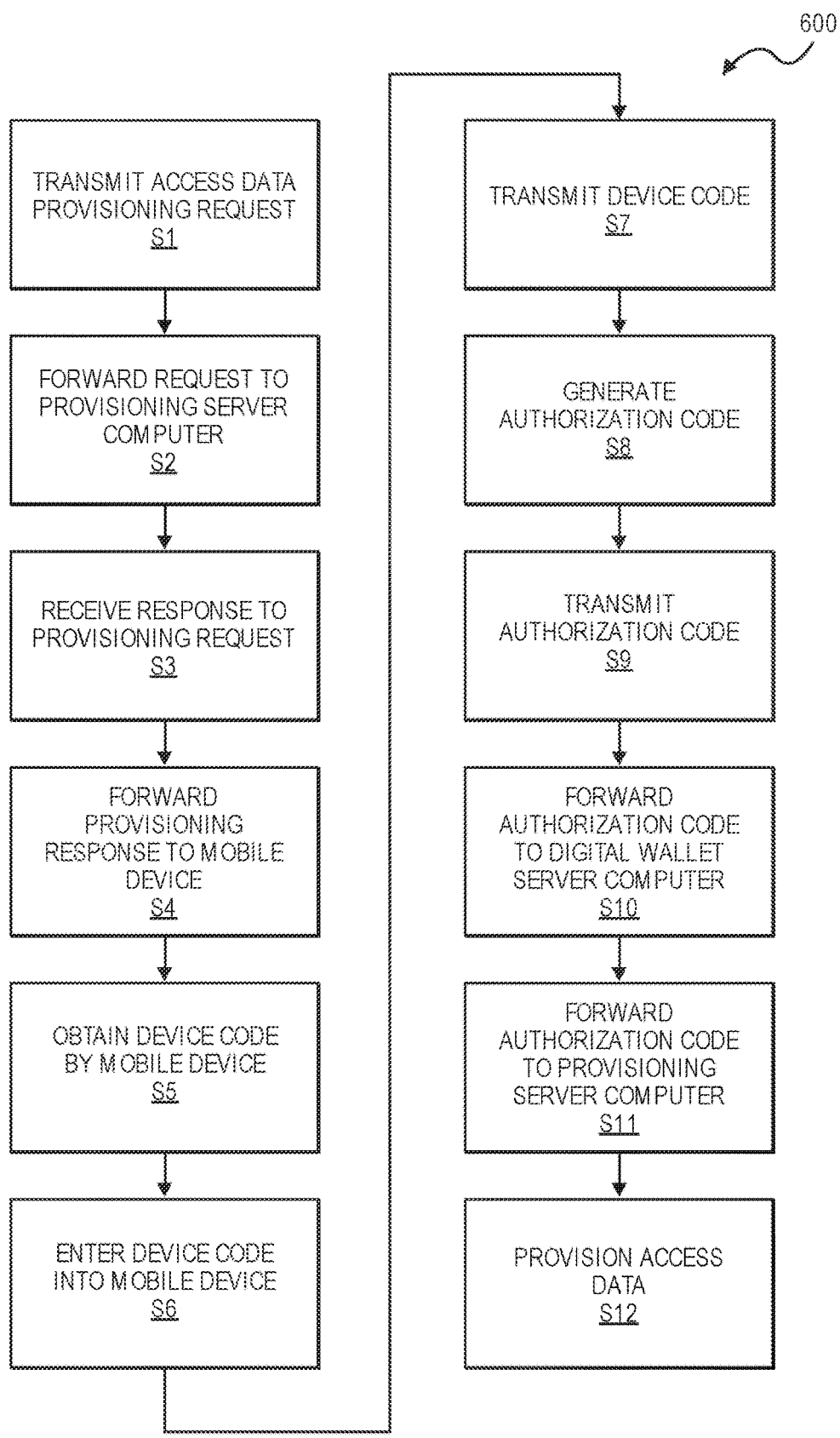
FIG. 6 shows a flowchart illustrating steps in a process flow according to an embodiment of the invention.

Some methods according to embodiments of the invention can be described with reference to FIGS. 1 and 6. In embodiments of the invention, a user (not shown) may wish to provision a mobile device 10 with one or more access credentials. In some embodiments, the one or more access credentials may be one or more payment credentials such as one or more payment tokens (and their associated data such as expiration dates, crytograms, etc.).

The user may first interact with a first application 20A on the mobile device 10 to start the process for provisioning access credentials to the mobile device 10. The first application 20A may be, for example, a digital wallet application which may be specifically associated with the digital wallet server computer 60. To start the process, the user may be prompted for authentication data and may enter authentication data (e.g., a username and password) into the first application 20A.

Then, in step S1, once the first application 20A has authenticated the user, the mobile device 10 may transmit a provisioning request to the digital wallet server computer 60. The provisioning request may be in the form of a token request message. In some embodiments, the provisioning request may include a primary account identifier (a "PAN") for a payment account and/or a mobile phone number for the mobile device 10. It may also optionally include any information that may be needed by the provisioning server computer 80 to generate a device code. In some cases, the payment account identifier may be specifically associated with a payment device such as a payment card. The provisioning request may request an access credential such as a payment token associated with the primary account identifier.

After the digital wallet server 60 receives the provisioning request, the digital wallet server computer 60 may verify the provisioning request. Verification can occur in any suitable manner. For example, if the provisioning request includes an account identifier and/or a phone number (e.g., or device data), the digital wallet server 60 may determine if it recognizes one or both of these, and/or if the circumstances surrounding the request might otherwise indicate that the transmission is not authentic. If the provisioning request is valid, in step S2, the digital wallet server computer 60 may forward it to the access credential provisioning server computer 80.

After the access credential provisioning server computer 80 receives the provisioning request, it may determine whether or not the risk associated with provisioning exceeds a predetermined threshold. In this regard, the access credential provisioning server computer 80 can analyze the PAN and any other data (e.g., a device ID) coming from the mobile device 10. For example, the provisioning server computer 80 may check the PAN to see if it has been reported stolen or has been involved in suspect transactions. If it does not exceed the predetermined threshold, then the mobile device 10 can be provisioned with the one or more access credentials over the air as shown by step S12. If it does exceed the predetermined threshold, then an additional authentication process may be performed.

The additional authentication process may also include any suitable authentication steps. In some embodiments, the user may be instructed to log into an account associated with the authorizing entity associated with the authorization computer 40, or otherwise provide authentication data to the authorizing entity (e.g., an issuer). For example, in step S3, the access credential provisioning server computer 80 may transmit a message back to the digital wallet server computer 60, or directly to the mobile device 10. In step S4, after receiving the message from the access credential provisioning server computer 80, the digital wallet server computer 60 may transmit the message back to the mobile device 10. The message may include an instruction or direction for the mobile device 10 or the user of the mobile device 10 to contact the authorization computer 40.

Embodiments of the invention may also utilize a device code, which is obtained by the mobile device 10 and is eventually provided to the authorization computer 40 so that the authorization computer 40 can generate an authorization code. The device code may be derived from data that is specifically associated with the mobile device 10. The device code can be used by the access credential provisioning server computer 80 to verify that the mobile device 10 can be provisioned with the requested access credentials.

In some embodiments, the message that is transmitted from the access provisioning server computer 80 to the mobile device 10 may include the device code. There can be a number of different options for providing the device code to the mobile device 10. In one option, the device code could be appended to a URL (e.g., as a parameter) in a link for the user to select. The user may select the link using the browser on the mobile device 10 and may be directed to a host site on the authorization computer 40. The host site may be the user's online banking website, which may be run on the authorization computer 40. In another option, the device code may be displayed to the user on the mobile device 10, and the user may be manually enter the device code into a second application 20B associated with the authorization computer 40, or the host site associated with the authorization computer 40. In some embodiments, the device code may be short enough (e.g., 6 decimal digits) so that it is simple for the user to remember and enter into the second application 20B and/or the host site (e.g., an online banking website) associated with the authorization computer 40.

In some embodiments, the access credential provisioning server computer 80 may include a token service provider system including a token vault. The token provider system may generate the device code from data elements that the token vault knows about the mobile device 10. Some non-limiting examples of such data elements include a secure element identifier (SE ID), an IMEI number, a phone number, a geo-location, a device serial number, etc. The access credential provisioning server computer 80 may have received this information from the user and/or the mobile device 10 before the provisioning request was transmitted by the mobile device 10. Alternatively, this information may have been provided to the access credential provisioning server computer 80 in the provisioning request. The authorization computer 40 operated by the issuer may not have to know which data elements have been used for the calculation of the device code, or even how the device code was calculated.

In other embodiments of the invention, the device code may be generated by the mobile device 10 instead of being received from the access credential provisioning server computer 80. The mobile device 10 or an application on the mobile device 10 (e.g., a wallet provider application, O/S, or device setting applications on the mobile device 10) may generate the device code, using any device specific data elements. However, the mobile device 10 may use the data elements that are available and known to the provisioning server computer 80, since the provisioning server computer 80 may have to regenerate the device code. In this case, the provisioning server computer 80 and the mobile device 10 may share the information needed to generate the device code.

Depending on how the authorization computer 40 operated by the issuer is set up, instructions may come in different forms. In a first example, a URL may be provided, with dynamic elements calculated on the mobile device 10 (e.g. from a wallet provider application, O/S, device settings application, etc.) and/or access credential provisioning server computer 80. The user may click on the URL, thereby opening an online banking login prompt with extra data being transferred to the authorization computer 40 operated by the issuer. That extra data can then be used by the authorization computer 40 after the user has logged in. In a second example, the URL may be static and the user may manually enter any dynamic data into any appropriate fields, once the user is logged into the online banking session.

In step S5, the device code is obtained as described above (e.g., either by generating it or by receiving it from the access credential provisioning server computer 80).

In step S6, after the mobile device 10 obtains the device code, the device code may be provided to the authorization computer 40. In some embodiments, the device code may be manually or automatically entered into the second application 20B on the mobile device 10. In other embodiments, the use of a dedicated specific application is not necessary and the mobile device 10 may have a browser which can contact the authorization computer 40. In step S7, the device code may be transmitted to the authorization computer 40.

In step S8, after the authorization computer 40 obtains the device code, the authorization computer 40 may generate an authorization code. The user may log into the authorization computer 40 (i.e., either through a browser or through the second application 20B). In some cases, the user may need to identify to the authorization computer 40 which primary account number that the user wishes to provision to the mobile phone 10.

The authorization code may be generated in any suitable manner. In some embodiments, the authorization computer 40, which is operated on behalf of an issuer, may then calculate the authorization code. The authorization code may identify the authorizing entity (e.g., the issuer), the mobile device, and the PAN (or its associated token) to provision. The authorization code may authorize the provisioning of a token for that particular PAN on the mobile device 10, for that issuer.

In one embodiment for generating the authorization code, the authorization computer 40 operated by the issuer may share a cryptographic secret key with the access credential provisioning server computer 80. In this variation, the device code and the PAN may be optionally concatenated together with a UTC date and time, and then processed by an algorithm such as a MAC (message authorization code) algorithm. The MAC algorithm may be an ISO approved MAC function, such as for example, CBC-MAC, H-MAC or CMAC, using either TDES or AES as the underlying encryption algorithm. In the case of using H-MAC, the issuer may utilize an appropriate hash function, such as SHA-2 or SHA-3. The MAC result (e.g., 8 bytes if TDES is used as encryption algorithm, 16 bytes if AES is used, etc.) may then be converted to N digits (e.g., or characters, if the issuer decides to use alpha-numeric characters), where N is an issuer chosen parameter. The parameter N may be chosen so that the resulting number or text string may be easily entered by the user, while not being susceptible to guessing by a fraudster. For example, N=6 or N=8 may be reasonable choices in some embodiments of the invention. The authorization code may then be the N digits or characters.

The authorization code may then be displayed for the user, and the user may be instructed to enter it in the provisioning session. The access credential provisioning server computer 80, which may include a token vault, may re-calculate the authorization code and may validate it.

There are many ways of converting hex numbers to decimal or alpha-numeric numbers. For optimal security, such a conversion may be done without bias, so that every possibility is equally likely. See, for example, U.S. patent application Ser. No. 12/202,978 (US Patent Publication No. 20090063354), which is herein incorporated by reference in its entirety for all purposes.

In another variation, the device code, the PAN, the shared secret, and a salt (e.g., other random data available to the provisioning server computer 80 and the mobile device 10), may be input into a one-way function. The result may be truncated and decimalized to N digits or characters, and the N digits or characters can be the authorization code. An example of implementing the one-way function may be to concatenate the data elements and hash them with an appropriate hash function. Another example may be to concatenate the device code and the PAN and use the keyed hash function (e.g., H-MAC) using the shared secret as a key.

As a preparatory step applicable for both variations described above, the authorization computer 40 may share a secret (e.g., a cryptographic key or a shared secret) with the provisioning server computer 80. The authorization computer 40 may then use standard mechanisms to share this data. For example, the authorization computer 40 may generate it and send it to the provisioning server computer 80 encrypted using a key encrypting key, have the provisioning server computer 80 generate it and send it to the issuer encrypted under a key encrypting key, or use manual distribution methods.

In some embodiments, the user may use the authorization code in the provisioning session.

In one embodiment, in a provisioning session that starts from an online banking session, one option may be for the authorization computer 40 to use the public key of the provisioning server computer 60 to transmit the authorization code to the provisioning server computer 80 for a particular combination of the PAN, mobile device, and authorizing entity (e.g., an issuer). This case may differ from those described above in some ways. For example, this may not be a step-up scenario, but may be done at the time of initial provisioning request. Also, the user may not be manually entering the authorization code, since the authorization code may be encrypted using a public key. For this reason, the hashing of the data that constitutes the authorization code is motivated by cutting down the size of the data rather than protecting its confidentiality or integrity. The public key encryption process may do both.

In some embodiments, in order to prevent a rogue entity from creating such a message (since in principle a public key is public), the authorization computer 40 may put unique information into the message together with the shared secret (e.g., a passphrase) for the provisioning server computer 80, so that the same kind of message may not be generated. In other embodiments, the unique information could be a counter, timestamp, etc.

In step S9, after the authorization computer generates the authorization code, the authorization computer 40 may send the authorization code to the mobile device 10.

In step S10, after the mobile device 10 receives the authorization code, the mobile device 10 may send the authorization code to the digital wallet server computer 60.

In step S11, the digital wallet server computer 60 may provide the authorization code to the access credential provisioning server computer 80. After receiving the authorization code, the access credential provisioning server computer 80 can then validate the authorization code. The validation can occur in any suitable manner. For example, the access credential provisioning server computer 80 may validate the authorization code by recreating the authorization code and comparing the recreated code with the received code. In other embodiments, the provisioning server computer 80 may validate the authorization code by extracting elements such as the device code, and optionally any credentials or authorization computer or authorizing entity identifiers from the authorization code, and comparing those extracted elements with elements that have been previously obtained by the provisioning server computer 80.

In step S12, if the authorization code is validated by the provisioning server computer 80, the access credential provisioning server computer 80 provisions the mobile device 10 with the one or more access credentials over the air. Once provisioned, the mobile device 10 may then be configured to provide the one or more access credentials to an access device to gain access to a resource (e.g., a location, good or service, etc.).

Figure 2:
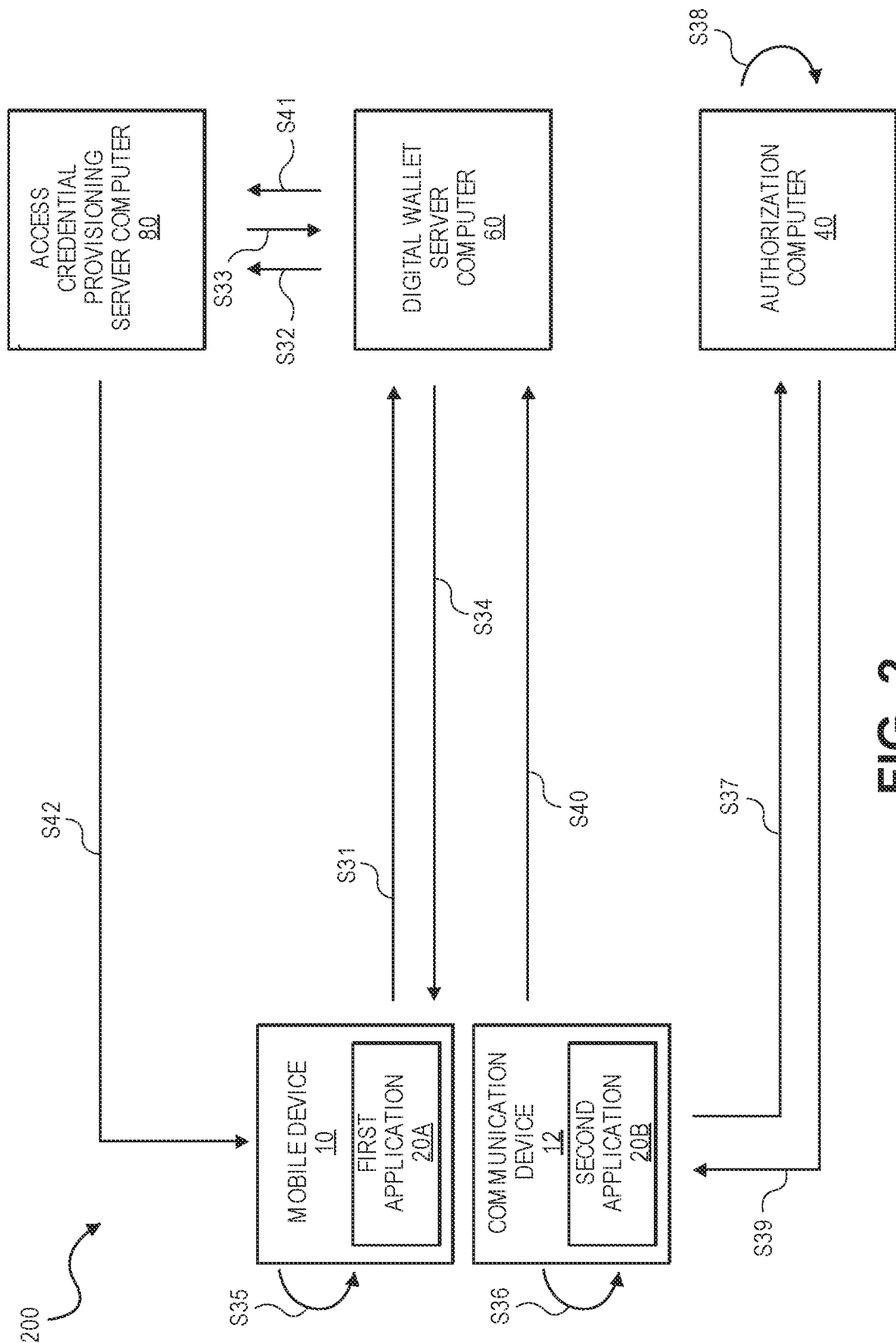
FIG. 2 shows a block diagram of a system according to another embodiment of the invention, with a process flow.
Figure 7:
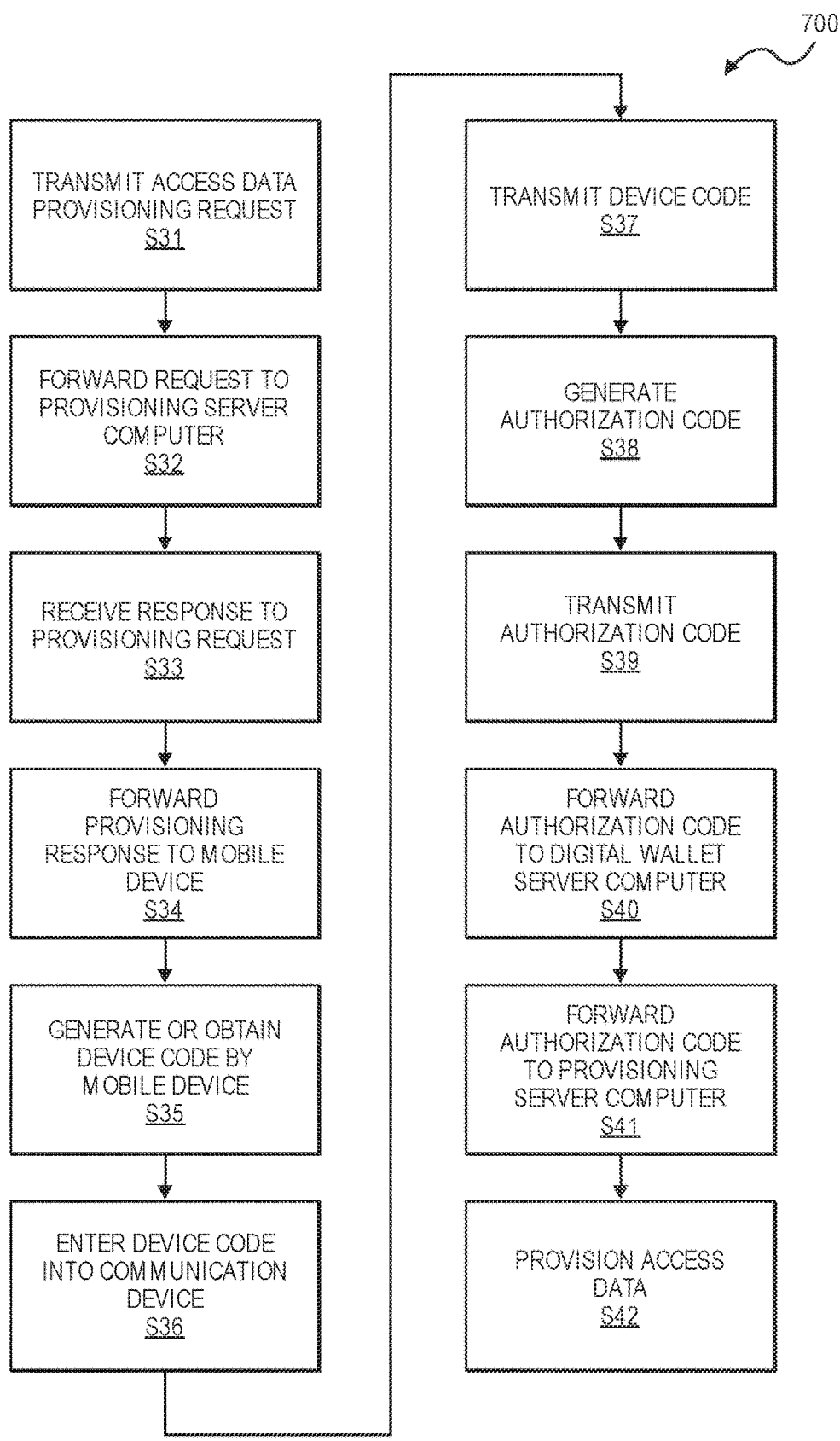
FIG. 7 shows a flowchart illustrating steps in a process flow according to another embodiment of the invention.

FIG. 2 shows another system according to an embodiment of the invention. A method using the system in FIG. 2 can be described with reference to FIG. 7.

The system in FIG. 2 is similar to the system in FIG. 1 (which like reference numbers designated like elements), except that a separate communication device 12 may be used to communicate with the authorization computer 40, instead of using the mobile device 10 to do so. The communication device 12 could by any suitable device including a table, laptop or desktop computer, which is physically separate from the mobile device 10.

In FIG. 2, steps S31, S32, S33, S34 and S35 are analogous to steps S1, S2, S3, S4, S5 in FIG. 1. The descriptions of analogous steps need not be repeated herein and the descriptions above are incorporated herein.

After the device code is obtained in step S35, as described above in step S5, the user may provide (e.g., enter) the device code to the communication device 12 instead of the mobile device 10 as in the embodiment described above with respect to FIG. 1.

In step S36, after the communication 12 obtains the device code, the device code may be provided to the authorization computer 40. In some embodiments, the device code may be manually or automatically entered into the second application 20B in the communication device 12. Manual entry may be accomplished by simply keying or speaking the device code into the communication device 12. Automatic entry of the device code into the mobile device 10 can occur by electrically connecting the mobile device 10 and the communication device 12 (e.g., via a short range connection such as Bluetooth™. In other embodiments, the use of a dedicated specific application is not necessary and the mobile device 10 may have a browser which can contact a host site running on the authorization computer 40. In step S37, the device code may be transmitted to the authorization computer 40 by the communication device 12.

In step S38, after the authorization computer 40 obtains the device code, the authorization computer 40 may generate an authorization code. The user may log into the authorization computer 40 (i.e., either through a browser or through the second application 20B). In some cases, the user may need to identify which primary account number that the user wishes to provision.

In step S39, after the authorization computer generates the authorization code, the authorization computer 40 may send the authorization code to the communication device 12, or possibly directly to the mobile device 10. If the authorization code is sent to the communication device 12, then the user will need to enter it into the mobile device 10. This can be done manually or automatically (e.g., via Bluetooth™, a QR code, etc.).

In step S40, after the mobile device 10 receives the authorization code, the communication device 12 may send the authorization code to the digital wallet server computer 60.

In step S41, the digital wallet server computer 60 may provide the authorization code to the access credential provisioning server computer 80. After receiving the authorization code, the access credential provisioning server computer 80 can then validate the authorization code.

In step S42, if the authorization code is validated by the provisioning server computer 80, the access credential provisioning server computer 80 provisions the mobile device 10 with the access credential over the air. Once provisioned, the mobile device 10 may then be configured to provide the one or more access credentials to an access device to gain access to a resource (e.g., a location, good or service, etc.).

Additional details regarding steps S37, S38, S39, S40, S41, and S42 can be found above with reference to steps S7, S8, S9, S10, S11, and S12.

Figure 3:
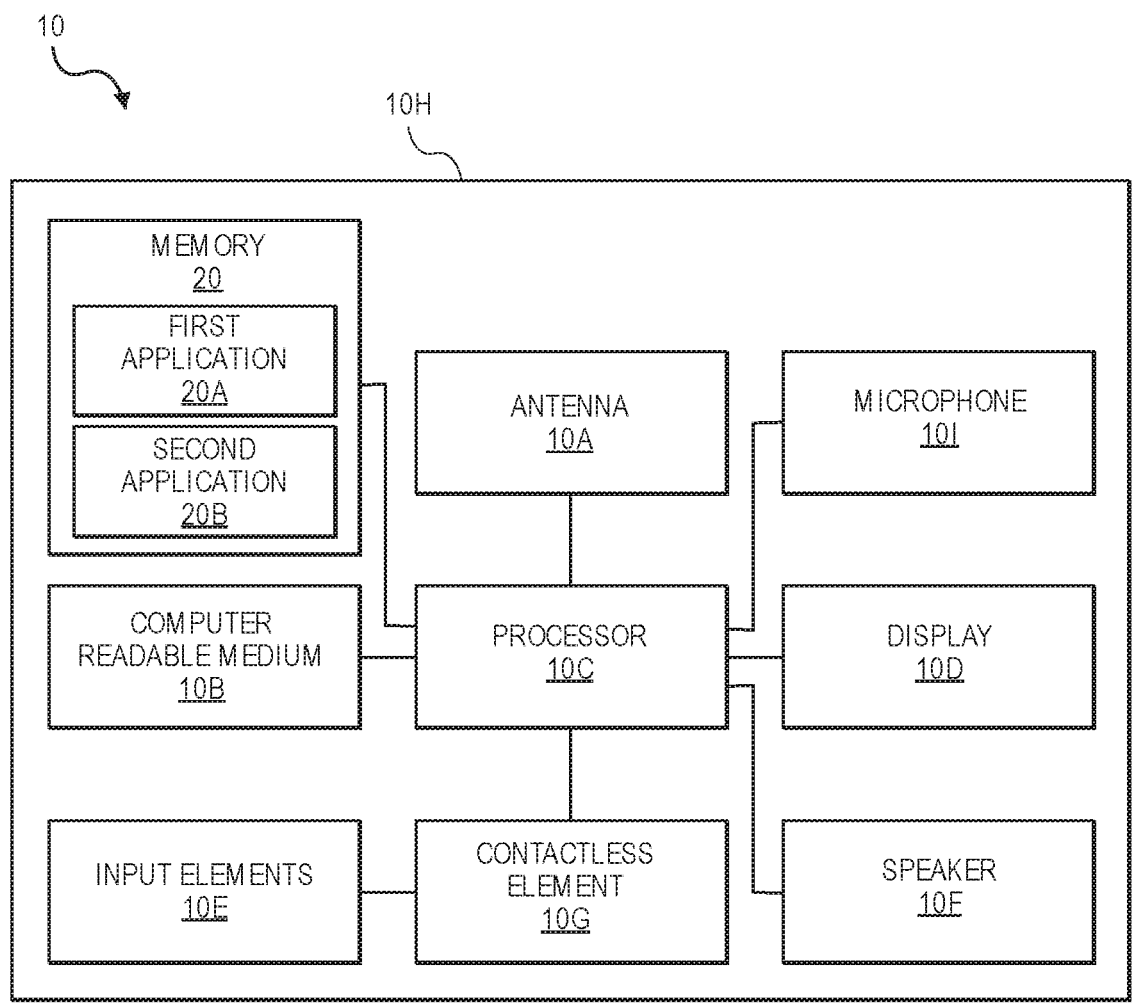
FIG. 3 shows a block diagram of a mobile device according to an embodiment of the invention.

FIG. 3 shows a block diagram of a mobile device 10 according to an embodiment of the invention. In some embodiments, the mobile device 10 may be a payment device that can be used to make payments or a device which can allow a user to gain access to a location. The exemplary mobile device 10 may comprise a computer readable medium 10B that can be present within the body 10H of the mobile device 10. The computer readable medium 10B may be in the form of a memory that stores data. In some cases, the memory 10B may also store information such as access credentials. In general, any of this information may be transmitted by the mobile device 10 to another device, using any suitable method, including the use of antenna 10A or contactless element 10G. The body 10H may be in the form a plastic substrate, housing, or other structure.

The computer readable medium 10B may comprises code, executable by the processor for implementing a method comprising providing a device code to an authorization computer, wherein the authorization computer thereafter generates an authorization code using at least the device code, receiving the authorization code, providing the authorization code to an access credential provisioning server computer, and receiving a credential, wherein the mobile device is configured to provide the credential to an access device to gain access to a resource.

In some embodiments, the mobile device 10 may further include a contactless element 10G, which is typically implemented in the form of a semiconductor chip (or other data storage element) with an associated wireless transfer (e.g., data transmission) element, such as an antenna. Contactless element 10G may be coupled to (e.g., embedded within) the mobile device 10 and data or control instructions that are transmitted via a cellular network may be applied to the contactless element 10G by means of a contactless element interface (not shown). Contactless element 10G may be capable of transferring and receiving data using a short range wireless communication capability. As noted above, mobile device 10 may comprise components to both be the interrogator device (e.g. receiving data) and the interrogated device (e.g. sending data). Thus, the mobile device 10 may be capable of communicating and transferring data or control instructions via both cellular network (or any other suitable wireless network—e.g. the Internet or other data network) and short range communications.

The mobile device 10 may also include a processor 10C (e.g., a microprocessor) for processing the functions of the mobile device 10 and a display 10D to allow a consumer to see phone numbers and other information and messages. The mobile device 10 may further include input elements 10E to allow a user to input information into the device, a speaker 10F to allow the user to hear voice communication, music, etc., and a microphone 10I to allow the user to transmit his or her voice through the mobile device 10. The mobile device 10 may also include an antenna 10A for wireless data transfer (e.g., data transmission).

A memory 20 may be coupled to the processor 10C and may store a first application 20A and a second application 20B. The memory 20 may be in the form of one or more memory devices (e.g., RAM, EEPROM, ROM chips), using any suitable mode of data storage. In some embodiments, the memory 20 in the mobile device 10 may also include a secure storage area for storing sensitive data such as payment credentials (account numbers, payment tokens, verification values, etc.) and access credential. For example, the memory 20 may be part of or may contain a secure element.

The first application 20A may be associated with an entity such as the digital wallet server computer 60. The first application 20A is generally less trusted by the authorizing entity that operates the authorization computer, since the first application 20A was not developed by the authorizing entity. Examples of first applications may include digital wallet applications, merchant applications, fitness applications, and any other suitable application that may be present on the mobile device 10.

In some embodiments, the second application 20B is an application that is specifically associated with the authorization computer 40 and is generally trusted by the authorizing entity associated with the authorization computer 40. The second application 20B may be, for example, an issuer application such as a mobile banking application. Such applications are generally designed by the authorizing entity and can include data security measures that are specifically required by the authorizing entity.

Figure 4:
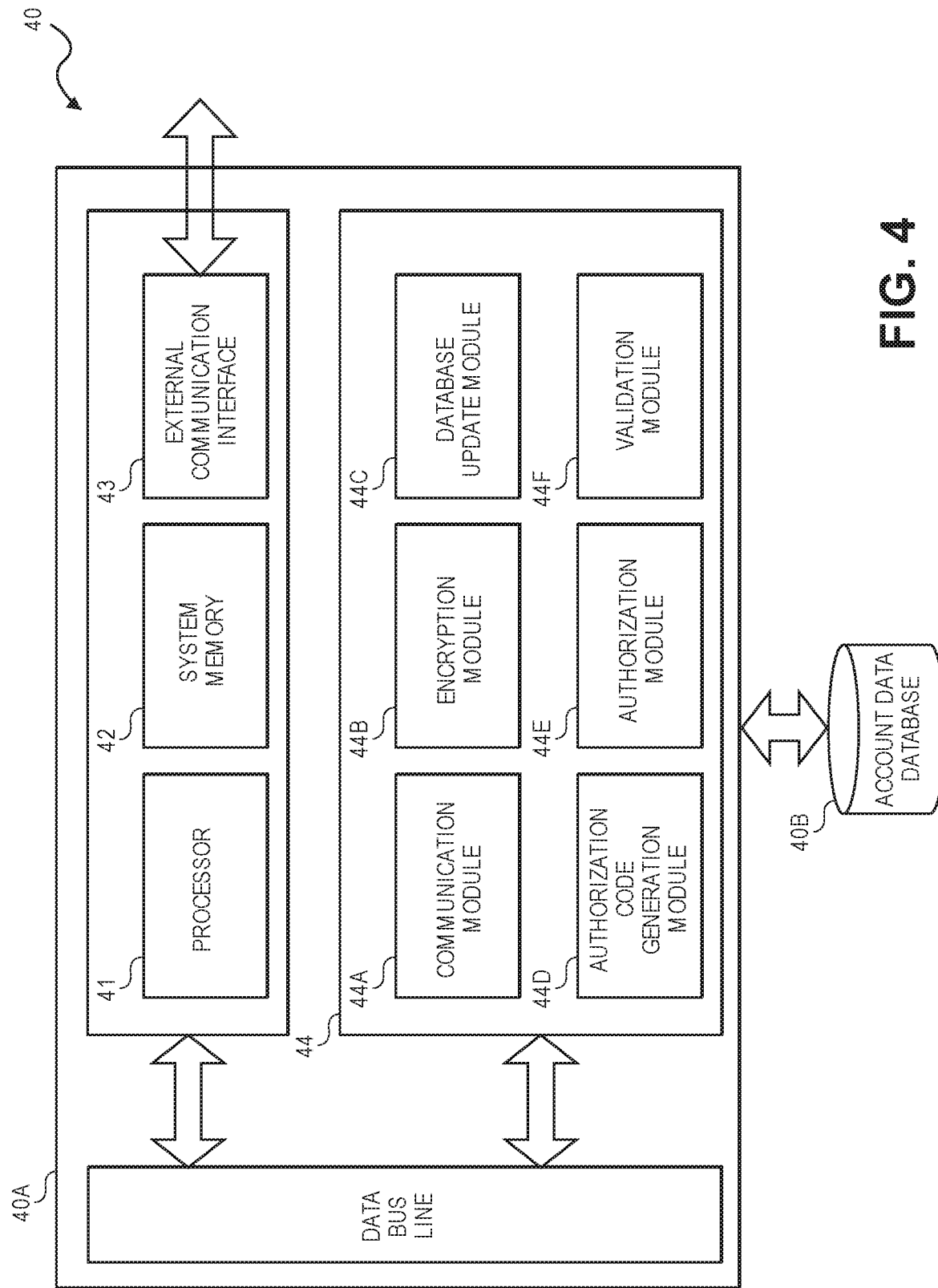
FIG. 4 shows a block diagram of an authorization computer according to an embodiment of the invention.

FIG. 4 shows a block diagram of an authorization computer 40 according to an embodiment of the invention. FIG. 4 shows a server computer 40A and an account data database 40B coupled to the server computer 40A.

The account data database 40B may hold accounts of various users that are affiliated with the authorizing entity associated with the authorization computer. For example, the authorizing entity may be an issuer bank and the database 40B may store account information for credit and debit card accounts for its customers.

The database 40B (as well as any other database described herein) may be a conventional, fault tolerant, relational, scalable, secure database such as Oracle™ or Sybase™. The database 1204 may be implemented using various standard data-structures, such as an array, hash, (linked) list, structured text file (e.g., XML), table, and/or the like. Such data-structures may be stored in memory and/or in (structured) files.

The server computer 40A may comprise a processor 41, which may be coupled to a system memory 42 and an external communication interface 43. A computer readable medium 44 may also be operatively coupled to the processor 41.

The computer readable medium 44 may comprise a number of software modules including a communication module 44A, an encryption module 44B, a database update module 44C, an authorization code generation module 44D, an authorization module 44E, and a validation module 44F.

The communication module 44A may comprise code that causes the processor 41 to generate messages, forward messages, reformat messages, and/or otherwise communicate with other entities.

The encryption module 44B may include any suitable encryption algorithms to encrypt data in embodiments of the invention. Suitable data encryption algorithms may include DES, triple DES, AES, etc. It may also store encryption keys that can be used with such encryption algorithms. The encryption module 44B may utilize symmetric or asymmetric encryption techniques to encrypt and/or verify data.

The database update module 44C may work in conjunction with the processor 41 to update account information in the account data database 40B.

The authorization code generation module 44D may comprise computer code, which when executed by the processor 41, generates an authorization code. Specific authorization code generation processes are described above.

The authorization module 44E may comprise code that can cause the processor 41 to evaluate authorization request messages for transactions and determine if the transactions should be authorized. Such transactions may be authorized or declined based upon a number of factors including the level of potential fraud and/or the amount of funds or credit associated with the accounts being used to conduct the transactions.

The validation module 44F may comprise code, which causes the processor 41 to validate authentication credentials received from a user's mobile device. The validation module 44F may include code for causing the processor 41 to retrieve data from the database 40B and compare it to received data.

In some embodiments, the computer readable medium 44 may comprise code, executable by the processor to implement a method comprising: receiving a device code from a mobile device or a communication device operated by a user; generating an authorization code using the device code; and transmitting the authorization code to the mobile device or the communication device. The authorization code is provided by the user to a provisioning server computer, which verifies the authorization code and provisions the mobile device with access credentials.

Figure 5:
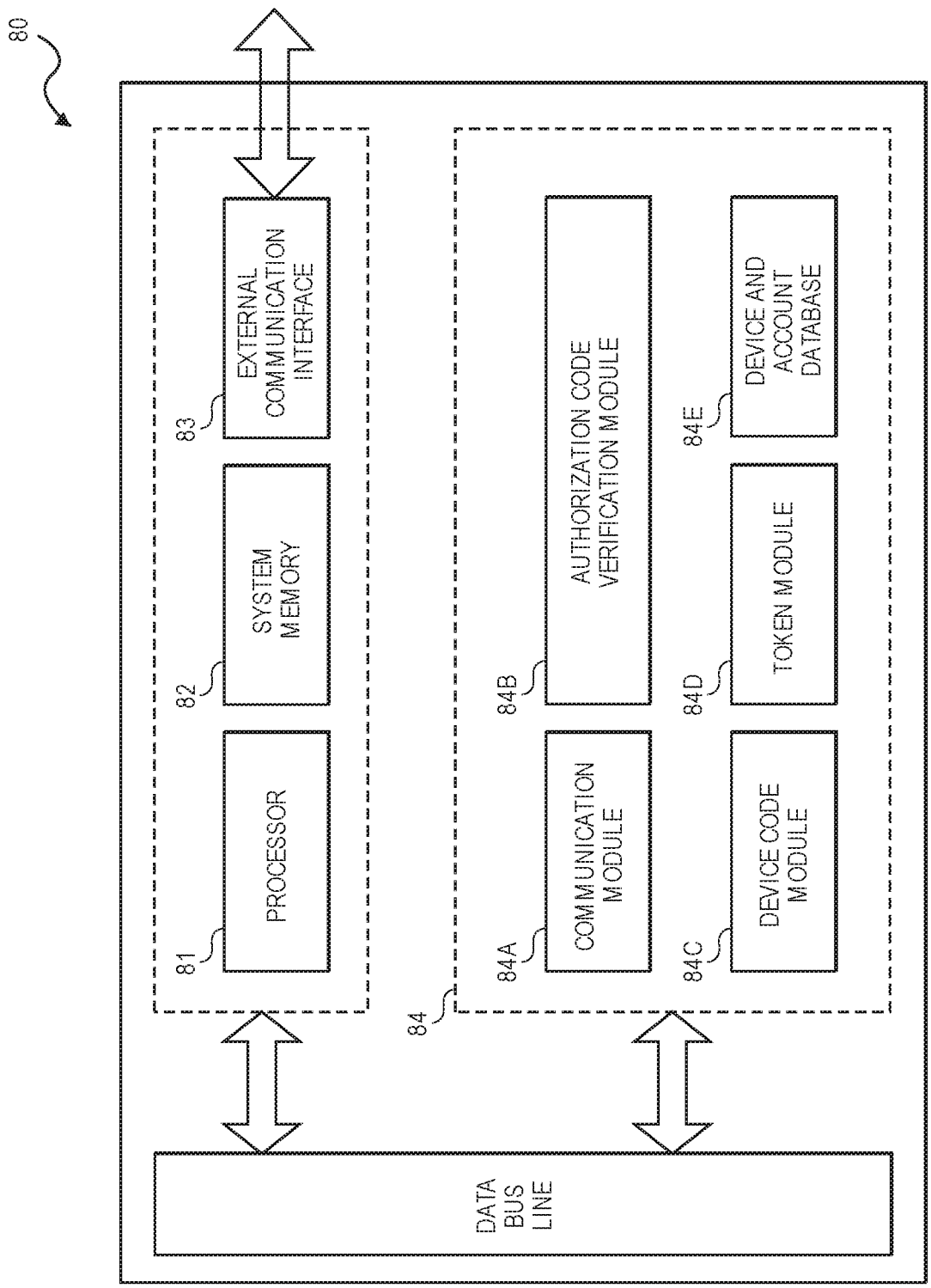
FIG. 5 shows a block diagram of a provisioning server computer according to an embodiment of the invention.

FIG. 5 shows a block diagram of an access credential provisioning server computer 80 according to an embodiment of the invention. The access credential provisioning server computer 80 may also comprise a token service system comprising a token vault and may be in a payment processing network in some embodiments of the invention. The access credential provisioning server computer 80 may comprise a processor 81, which may be coupled to a system memory 82 and an external communication interface 83. A computer readable medium 84 may also be operatively coupled to the processor 81.

In some embodiments, the validation computer 80 may be part of a payment processing network that switches transaction request and responses between issuers and acquirers. A payment processing network may be a transaction processing network. A transaction processing network may process payment transactions or other types of access transactions.

The computer readable medium 84 may comprise a number of software modules including a communication module 84A, an authorization code verification module 84B, a device code module 84C, a token module 84D, and a device and account database 84E.

The communication module 84A may comprise code that causes the processor 81 to generate messages, forward messages, reformat messages, and/or otherwise communicate with other entities.

The authorization code verification module 84B may comprise code that causes the processor 81 to determine an authorization code, and/or receive an authorization code and determine if it is valid (as described above).

The device code module 84C may comprise code that causes the processor 81 to generate a device code as described above. The device code module 84C and the processor 81 may also be used to determine the data elements that may have been used to form the device code.

The token module 84D may comprise code that can cause the processor 81 to generate or otherwise obtain access tokens. In some embodiments, tokens may be mathematically derived from real credentials such as PANs, while in other embodiments, tokens may have no mathematical relationship with real credentials. In the latter case, tokens may be obtained by the token module 84D and the processor 81 by looking up tokens that are specifically assigned to real credentials.

The device and account database 84E may store data including account information, device information, and any other information pertinent to a particular user. Database 84E may store information including user account information, information about devices that may be associated with the user account information, device codes, information used to form the device codes, etc.

Figure 8:
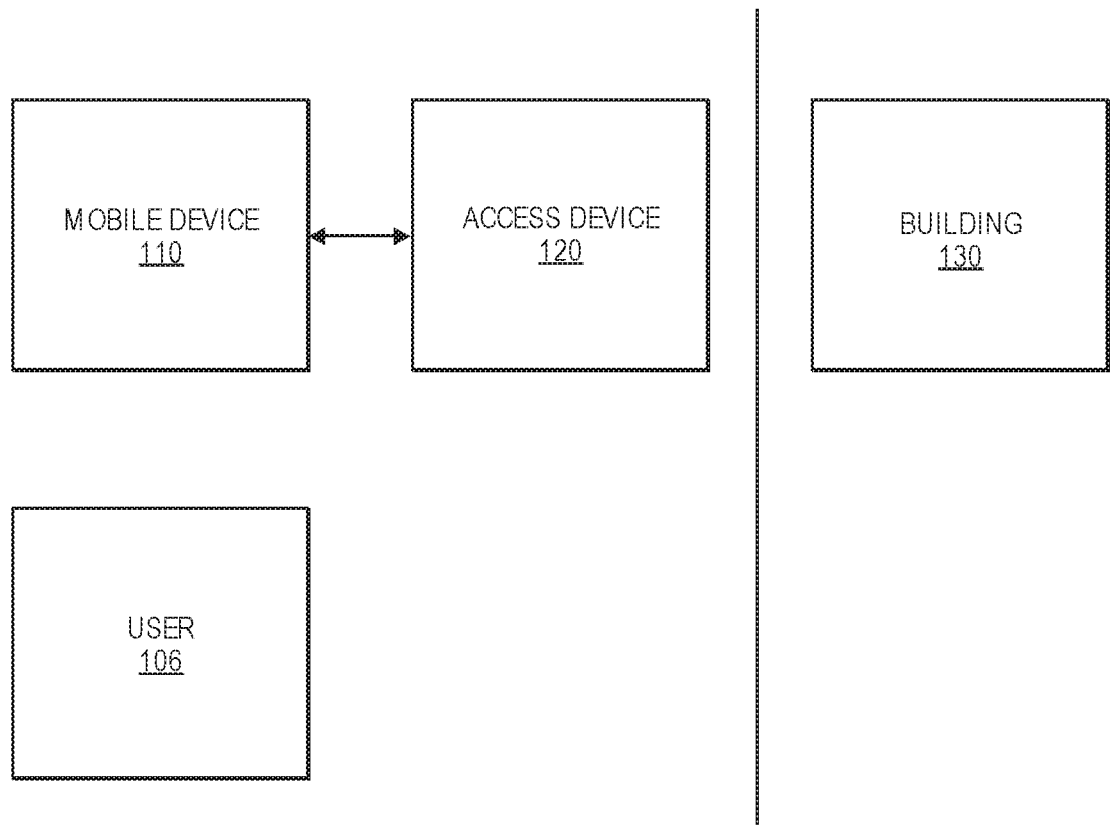
FIG. 8 shows a block diagram of a building access system that can use a mobile device with an access credential.
Figure 9:
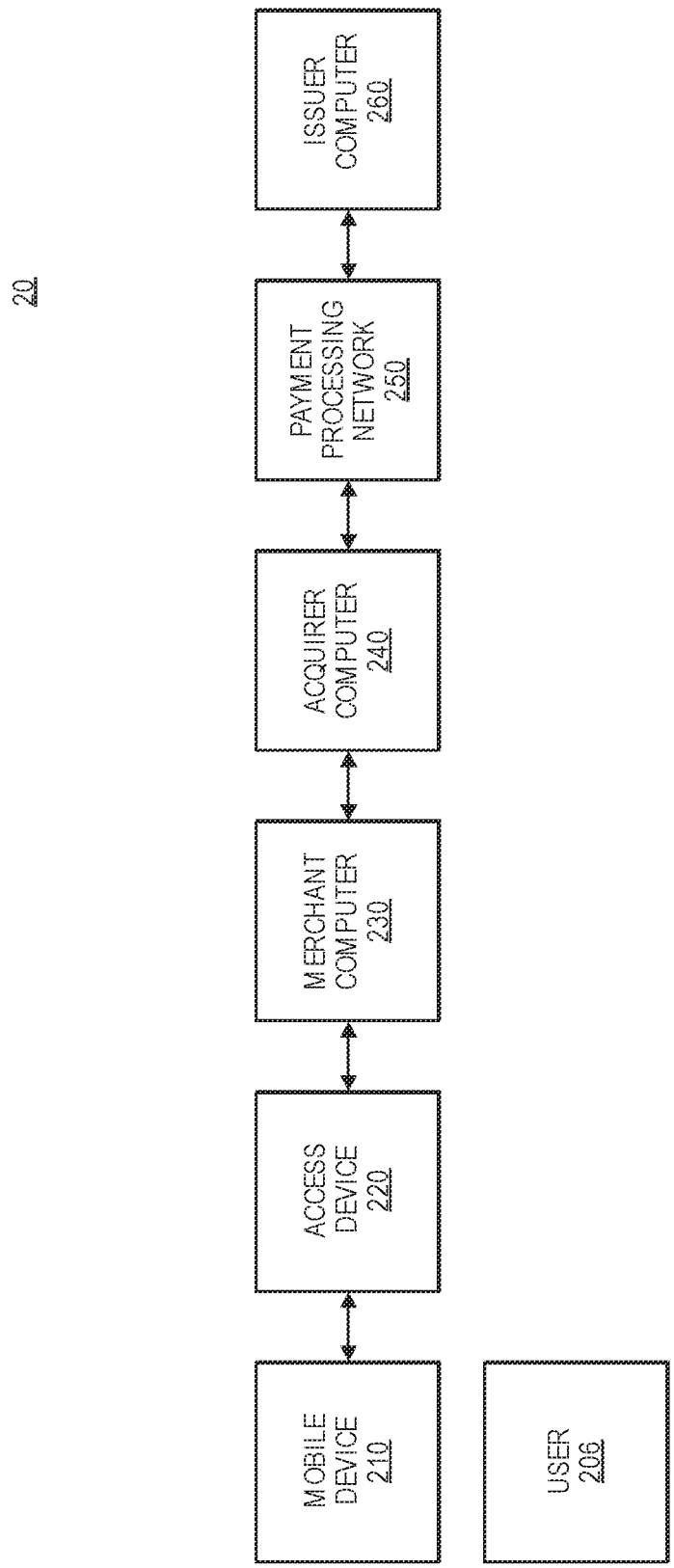
FIG. 9 shows a block diagram of a transaction processing system that can use a mobile device with an access credential.

Once a mobile device 10 is provisioned with access credentials, it can be used to conduct various types of transactions including payment transactions, data access transactions, transit transactions, and physical access transactions. FIGS. 8 and 9 show two exemplary uses for a mobile device 10 that is provisioned with access credentials.

FIG. 8 shows a block diagram of a building access system. FIG. 8 shows a mobile device 110 operated by a user 106. The mobile device 110 has been provisioned with access credentials as described above. The mobile device 110 can interact with the access device 120 and pass access credentials to the access device 120. The access device 120 may locally verify the received access credentials or it may communicate with a remotely located authentication server computer (not shown). The remotely located authentication server computer may verify that the access credentials are authentic and may transmit a signal indicating this back to the access device 120. The access device 120 may then proceed to let the user 106 enter the building 130.

FIG. 9 shows a block diagram of a transaction processing system that can use a mobile device with access credentials. FIG. 9 shows a user 206 that can operate a mobile device 210. The user 206 may use the mobile device 210 to pay for a good or service at a merchant. The merchant may operate a merchant computer 230 and/or an access device 220. The merchant may communicate with an issuer computer 260 via an acquirer computer 240 and a payment processing network 250.

The payment processing network 250 may include data processing subsystems, networks, and operations used to support and deliver authorization services, exception file services, and clearing and settlement services. An exemplary payment processing network may include VisaNet™. Payment processing networks such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services. The payment processing network may use any suitable wired or wireless network, including the Internet.

A typical payment transaction flow using a mobile device 210 at an access device 220 (e.g. POS location) can be described as follows. A user 206 presents his or her mobile device 210 to an access device 220 to pay for an item or service. The mobile device 210 and the access device 220 interact such that one or more access credentials from the mobile device 210 (e.g. PAN, a payment token, verification value(s), expiration date, etc.) are received by the access device 220 (e.g. via contact or contactless interface). The merchant computer 230 may then generate an authorization request message that includes the information received from the access device 220 (i.e. information corresponding to the mobile device 210) along with additional transaction information (e.g. a transaction amount, merchant specific information, etc.) and electronically transmits this information to an acquirer computer 240. The acquirer computer 240 may then receive, process, and forward the authorization request message to the issuer computer 260 via the payment processing network 250 for authorization. The issuer computer 260 may reply with an authorization response message. The authorization response message may be transmitted from the issuer computer 260 to the access device 220 via the merchant computer 230, the acquirer computer 240, and the payment processing network 250.

At the end of the day or at some other suitable time interval, a clearing and settlement process between the acquirer computer 240, the payment processing network 250, and the issuer computer 260 may be performed on the transaction.

The devices and computers according to embodiments of the invention may incorporate a number of subsystems. The subsystems may be interconnected via a system bus. Additional subsystems such as a printer, keyboard, fixed disk (or other memory comprising computer readable media), monitor, which is coupled to display adapter, and others are shown. Peripherals and input/output (I/O) devices, which couple to I/O controller (which can be a processor or other suitable controller), can be connected to the computer system by any number of means known in the art, such as serial port. For example, serial port or external interface can be used to connect the computer apparatus to a wide area network such as the Internet, a mouse input device, or a scanner. The interconnection via system bus allows the central processor to communicate with each subsystem and to control the execution of instructions from system memory or the fixed disk, as well as the exchange of information between subsystems. The system memory and/or the fixed disk may embody a computer readable medium. In some embodiments, the monitor may be a touch sensitive display screen.

A computer system can include a plurality of the same components or subsystems, e.g., connected together by external interface or by an internal interface. In some embodiments, computer systems, subsystem, or apparatuses can communicate over a network. In such instances, one computer can be considered a client and another computer a server, where each can be part of a same computer system. A client and a server can each include multiple systems, subsystems, or components.

It should be understood that any of the embodiments of the present invention can be implemented in the form of control logic using hardware (e.g. an application specific integrated circuit or field programmable gate array) and/or using computer software with a generally programmable processor in a modular or integrated manner. As used herein, a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed:

1. A method comprising:
   receiving, by a provisioning server computer, a provisioning request message;
   receiving, by the provisioning server computer, an authorization code, the authorization code generated using at least a device code associated with a mobile device, wherein the device code is derived from a device identifier that specifically identifies the mobile device;
   validating, by the provisioning server computer, the authorization code; and
   responsive to validating the authorization code, provisioning, by the provisioning server computer, an access credential to the mobile device,
   wherein the authorization code is derived from the device code and the access credential.

2. The method of claim 1, wherein the provisioning request message is received from the mobile device.

3. The method of claim 1, wherein the provisioning request message is received from the mobile device via an intermediate server computer.

4. The method of claim 1, wherein the access credential is configured to gain access to a location.

5. The method of claim 1, wherein the provisioning request message comprises an account identifier.

6. The method of claim 1, wherein the mobile device is a smartphone.

7. The method of claim 1, further comprising:
   transmitting, by a communication device to an authorization computer, the device code; and
   receiving, by the communication device, the authorization code.

8. The method of claim 7, wherein the communication device is a laptop computer, and the mobile device is a mobile phone.

9. The method of claim 1, wherein the authorization code is generated by an authorization computer using a cryptographic key that is shared with the provisioning server computer.

10. The method of claim 1, wherein the authorization code is formed from the device code, the access credential, a shared secret, and a salt.

11. The method of claim 1, wherein the provisioning request message is a token request message.

12. The method of claim 1, wherein the access credential comprises a token.

13. The method of claim 1, further comprising:
   transmitting, by the provisioning server computer, the device code to the mobile device.

14. The method of claim 1, further comprising:
   determining, by the provisioning server computer, a risk associated with provisioning the access credential to the mobile device.

15. A provisioning server computer comprising:
   a processor; and
   a computer readable medium, the computer readable medium comprising code, executable by the processor to implement actions including:
   receiving a provisioning request message;
   receiving an authorization code, the authorization code generated using at least a device code associated with a mobile device, wherein the device code is derived from a device identifier that specifically identifies the mobile device;

validating the authorization code; and responsive to validating the authorization code, provisioning, an access credential to the mobile device, wherein the authorization code is derived from the device code and the access credential.

16. The provisioning server computer of claim 15, wherein the actions further comprise:

transmitting, by the provisioning server computer, the device code to the mobile device.

17. The provisioning server computer of claim 15, wherein the actions further comprise determining, by the provisioning server computer, a risk associated with provisioning the access credential to the mobile device.

* * * * *